Mar. 20, 1923

M. J. B. BARBAROU 1,449,029

SPEED REDUCER FOR AVIATION ENGINES

Filed Nov. 1, 1921

INVENTOR
Marius Jean Baptiste Barbarou

By Otto Munk his ATTORNEY.

Patented Mar. 20, 1923.

1,449,029

UNITED STATES PATENT OFFICE.

MARIUS JEAN BAPTISTE BARBAROU, OF PARIS, FRANCE.

SPEED REDUCER FOR AVIATION ENGINES.

Application filed November 1, 1921. Serial No. 512,143.

*To all whom it may concern:*

Be it known that I, MARIUS JEAN BAPTISTE BARBAROU, citizen of the French Republic, residing at Paris, in the Republic of France, have invented new and useful Improvements in Speed Reducers for Aviation Engines, of which the following is a specification.

This invention relates to a speed-reducer for aviation engines of the type wherein the propeller is centered upon a nose or sleeve situated in the axis of the cam shaft of the engine and having mounted thereon a gear wheel of large diameter which is driven by a pinion of small diameter mounted upon the crank shaft.

According to this invention, the gear wheel of large diameter which is mounted upon the nose or sleeve for driving the propeller is actuated by the pinion mounted on the crank shaft, through the intermediary of a pair of auxiliary gear wheels engaging the two first-mentioned gear wheels.

Each of the said auxiliary gear wheels is rotatably mounted upon a regulating sleeve which is mounted in eccentric position on the support thereof and may be secured in any desired angular position in order to be able to adjust the engagement of the gears with great accuracy.

In case the said propeller is to be actuated by an engine of relatively high power, the above disposition, i. e. the use of two auxiliary gears will permit of reducing the pressure on the teeth and the molecular stress of the metal to a considerable degree without requiring the use of gear wheels of a great length. The undue lengthening of the gear wheels is observed to give rise to various drawbacks, in that it requires a greater length and weight of the engine. On the other hand, an increased length of tooth will require a correspondingly greater accuracy in the machine work upon the teeth in order that the teeth shall roll properly upon each other. The smallest deviation from the parallel position or any changes in shape which may arise for instance from the treatment of the steel will act to destroy the effect which it is proposed to obtain by the lengthening of the teeth, inasmuch as the latter are now caused to bear upon only a small portion of the length.

In cases where two auxiliary gear wheels are employed to obtain the driving action, it is necessary in order to secure the correct operation of both gear wheels that the amount of play between the interengaging gears may be properly adjusted for each of the said wheels. This condition is also obtained in the device according to the invention.

In the accompanying drawings given by way of example:

Fig. 3 is a horizontal section of the gearing on the broken line Y—Y′, Fig. 2.

Fig. 4 is a vertical section on the line Z—Z, Fig. 5, of the device employed for mounting one of the auxiliary gear wheels.

Figure 1:
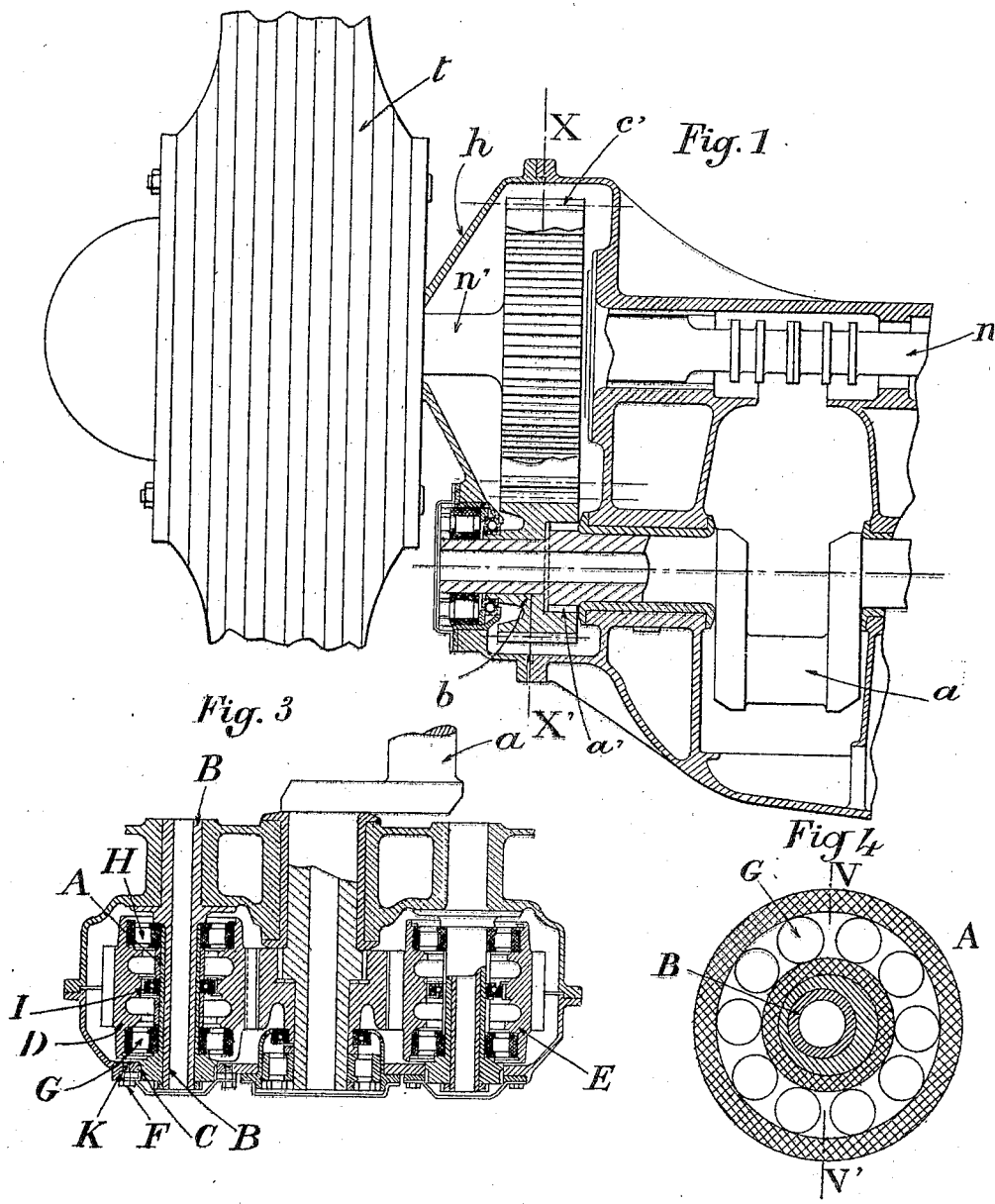
Fig. 1 is a partial longitudinal section on the axis of a speed reduction device for aviation engines according to the invention.
Figure 2:
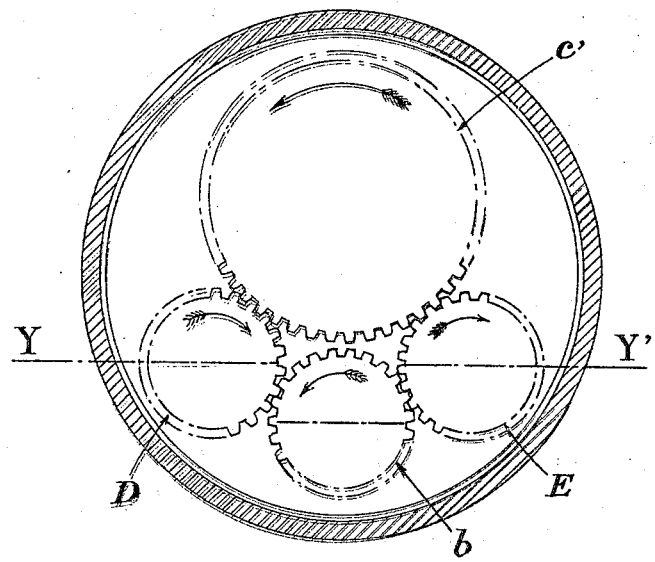
Fig. 2 is a cross-section on the line X—X′, Fig. 1.

As shown in the drawing, the crank-shaft $a$ is provided with a toothed portion $a'$ and terminates in a cylindrical extension whereupon is centered a pinion $b$. The latter is provided with an internal toothed portion engaging the teeth $a'$ and with an external toothed portion of small diameter which serves to actuate the large-diameter gear wheel $c'$. This latter gear wheel $c'$ is mounted upon a projecting sleeve or nose $n'$ forming an extension of the cam shaft $n$ and actuating the propeller $t$. The latter is centered upon a sleeve which is concentric with the nose $n'$ and forms a part of a member $h$ which is secured to the front face of the engine casing.

Figure 5:
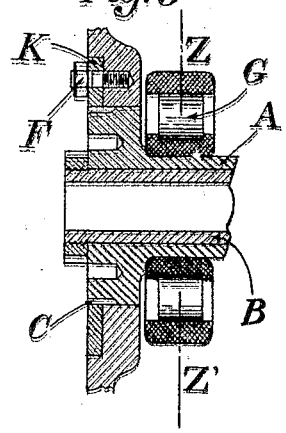
Fig. 5 is a section of the same on the line V—V, Fig. 4.
Figure 6:
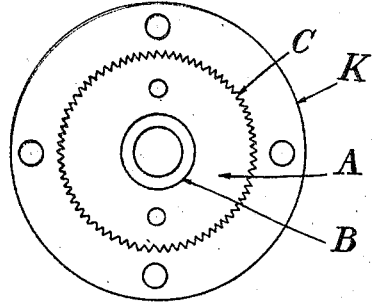
Fig. 6 is an elevation view, on the left hand side, corresponding to Fig. 5.

According to this invention, the pinion $b$ drives the gear wheel $c'$ through the intermediary of two auxiliary pinions D, E. Each of the latter pinions is mounted as shown in Figs. 3 to 5 upon a sleeve A which is slightly eccentric with reference to the hollow supporting axle B. The sleeve A is provided at the exterior with the gear teeth C. When the sleeve A is turned about, the auxiliary gear wheels D and E are given an inward or outward movement to the amount which is considered necessary to properly engage the gear teeth. When the gearing has been suitably adjusted, the eccentric sleeve A is held in the fixed position by a disc plate K which is provided with teeth corresponding to those of the said sleeve and is maintained in place by the bolts F. This method of adjustment is sufficiently sensitive to afford an adjustment between centers which is equal to 1/100 millimetre or less.

Each of the gear wheels D, E is mounted upon the respective sleeve A by means of a pair of roller or ball bearings G and H disposed at the ends of the said gear wheel and outwardly of the toothed portion in order to permit of constructing the hub of the gear wheel with a sufficient thickness of metal under the teeth to withstand the stresses to which it is submitted for the driving action.

Should roller bearings be employed, the gear wheel is maintained in position in the lengthwise sense by a thrust bearing of variable shape and disposition. In Fig. 3, a thrust bearing I having a single row of balls is used to prevent lengthwise movement in either direction.

It is obvious that the said invention is not limited to the details of construction which are hereinbefore set forth, these being given solely my way of example.

Having now described my invention, what I claim as new and desire to secure by Letters Patent is:

1. A speed reducer for aviation engines comprising an engine frame, a crank shaft rotatably supported in said frame, a driving pinion of small diameter secured on said crank shaft, a cam shaft, a driven pinion of larger diameter on said cam shaft, two intermediate auxiliary gears engaging with the said driving and driven pinions, a supporting nose secured to the engine frame and coaxial with the cam shaft, a propeller rotatably mounted on said nose, means for operatively connecting the cam shaft to the propeller and means for adjusting the distance between the said auxiliary gears on the one hand and the driving and driven pinions on the other hand.

2. A speed reducer for aviation engines comprising an engine frame, a crank shaft rotatably supported in said frame, a driving pinion of small diameter secured on said crank shaft, a cam shaft, a driven pinion of larger diameter on said cam shaft, two intermediate auxiliary gears engaging with the said driving and driven pinions, a supporting nose secured to the engine frame and coaxial with the cam shaft, a propeller rotatably mounted on said nose, means for operatively connecting the cam shaft to the propeller, adjusting sleeves upon which the auxiliary gears are rotatably mounted, respectively, supporting spindles upon which said adjusting sleeves are eccentrically and rotatably mounted and means for holding the adjusting sleeves in any desired angular position.

3. A speed reducer for aviation engines comprising an engine frame, a crank shaft rotatably supported in said frame, a driving pinion of small diameter secured on said crank shaft, a cam shaft, a driven pinion of larger diameter on said cam shaft, two intermediate auxiliary gears engaging with the said driving and driven pinions, a supporting nose secured to the engine frame and coaxial with the cam shaft, a propeller rotatably mounted on said nose, means for operatively connecting the cam shaft to the propeller, two supporting spindles, two adjusting sleeves eccentrically mounted and angularly adjustable on said supporting spindles, means for holding the adjusting sleeves in any desired angular position, and bearings mounted in the ends of the auxiliary gears laterally of the teeth thereof and supported on the adjusting sleeves.

4. A speed reducer for aviation engines comprising an engine frame, a crank shaft rotatably supported in said frame, a driving pinion of small diameter secured on said crank shaft, a cam shaft, a driven pinion of larger diameter on said cam shaft, two intermediate auxiliary gears engaging with the said driving and driven pinions, a supporting nose secured to the engine frame and coaxial with the cam shaft, a propeller rotatably mounted on said nose, means for operatively connecting the cam shaft to the propeller, two supporting spindles, two adjusting sleeves eccentrically mounted and regularly adjustable on said supporting spindles, means for holding the adjusting sleeves in any desired angular position, roller bearings mounted in the ends of the auxiliary gears laterally to the teeth thereof and supported on the adjusting sleeves and an intermediate ball thrust bearing for preventing axial relative displacement between the auxiliary gear and the adjusting sleeve.

In testimony whereof I have signed my name to this specification.

MARIUS JEAN BAPTISTE BARBAROU.